(12) United States Patent
Centonza et al.

(10) Patent No.: US 12,225,379 B2
(45) Date of Patent: Feb. 11, 2025

(54) USER PLANE SECURITY IN SPLIT RAN ARCHITECTURES

(71) Applicant: Telefonaktiebolaget LM Ericsson (publ), Stockholm (SE)

(72) Inventors: Angelo Centonza, Granada (ES); Maximilian Popescu, Skärblacka (SE); Ioanna Pappa, Stockholm (SE); Thomas Walldeen, Linköping (SE); Martin Israelsson, Spånga (SE); Alexander Vesely, Feldbach (AT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 471 days.

(21) Appl. No.: 17/607,312

(22) PCT Filed: May 4, 2020

(86) PCT No.: PCT/SE2020/050443
§ 371 (c)(1),
(2) Date: Oct. 28, 2021

(87) PCT Pub. No.: WO2020/226551
PCT Pub. Date: Nov. 12, 2020

(65) Prior Publication Data
US 2022/0210647 A1 Jun. 30, 2022

Related U.S. Application Data

(60) Provisional application No. 62/843,292, filed on May 3, 2019.

(51) Int. Cl.
*H04W 12/088* (2021.01)
*H04L 9/40* (2022.01)
(Continued)

(52) U.S. Cl.
CPC ....... *H04W 12/088* (2021.01); *H04L 63/0236* (2013.01); *H04L 63/164* (2013.01);
(Continued)

(58) Field of Classification Search
None
See application file for complete search history.

(56) References Cited

U.S. PATENT DOCUMENTS

| 9,565,167 B2 | 2/2017 | Roch |
| 10,327,143 B2 | 6/2019 | Sirotkin et al. |

(Continued)

FOREIGN PATENT DOCUMENTS

| CN | 105981431 A | 9/2016 |
| CN | 106998549 A | 8/2017 |

(Continued)

OTHER PUBLICATIONS

Ericsson, "IAB Node Integration Procedure", 3GPP TSG-RAN WG2 Meeting #106, Reno, Nv, USA, May 13, 2019, pp. 1-5, R2-1907010, 3GPP.

(Continued)

*Primary Examiner* — William J. Goodchild
(74) *Attorney, Agent, or Firm* — COATS & BENNETT, PLLC

(57) ABSTRACT

A network node (700) of a radio access network (RAN) of a wireless communication network (10) provides user plane security by establishing a secure tunnel between first and second tunnel endpoints (160, 180, 370, 195, 220, 230) that will handle respective protocol layers of a same protocol stack for a Data Radio Bearer (DRB) (330, 340, 350, 360) that is dedicated to user plane traffic and has yet to be established. Establishing the secure tunnel comprises exchanging an inner Internet Protocol (IP) address and an outer IP address of each of the endpoints (160, 180, 370,

(Continued)

195, 220, 230) between the endpoints (160, 180, 370, 195, 220, 230).

25 Claims, 18 Drawing Sheets

(51) Int. Cl.
  *H04W 76/12* (2018.01)
  *H04W 76/15* (2018.01)
  *H04W 92/20* (2009.01)
  *H04W 92/24* (2009.01)
(52) U.S. Cl.
  CPC .......... *H04W 76/12* (2018.02); *H04W 76/15* (2018.02); *H04W 92/20* (2013.01); *H04W 92/24* (2013.01)

(56) References Cited

U.S. PATENT DOCUMENTS

| | | | |
|---|---|---|---|
| 10,356,772 | B2 | 7/2019 | Zhu et al. |
| 2002/0091921 | A1* | 7/2002 | Kunzinger .......... H04L 63/0471 713/153 |
| 2015/0245307 | A1* | 8/2015 | Chen ...................... H04L 5/001 370/336 |
| 2016/0302110 | A1* | 10/2016 | Baboescu ......... H04W 28/0865 |
| 2019/0182211 | A1* | 6/2019 | Yang ..................... H04L 69/326 |

FOREIGN PATENT DOCUMENTS

| | | |
|---|---|---|
| CN | 107210929 A | 9/2017 |
| CN | 107925875 A | 4/2018 |

OTHER PUBLICATIONS

Qualcomm Inc., "Handling of IP fragmentation for NAS messages sent over non-3GPP access to 5GC", 3GPP TSG CT WG1 Meeting #111bis, Sophia-Antipolis (France), Jul. 9, 2018, pp. 1-5, C1-184541 (was C1-184254), 3GPP.
Ericsson, "Using NDS for IAB", 3GPP TSG-RAN WG2 #104, Spokane, USA, Nov. 12, 2018, pp. 1-4, R2-1817917, 3GPP.
3rd Generation Partnership Project, "3rd Generation Partnership Project; Technical Specification Group Services and System Aspects; Security architecture and procedures for 5G system (Release 15)", Technical Specification, 3GPP TS 33.501 V15.4.0, Mar. 1, 2019, pp. 1-187, 3GPP, France.
Ericsson, "Clarifications on multiple TNL associations", 3GPP TSG RAN WG3 #99bis, Sanya, P.R. China, Apr. 16, 2018, pp. 1-8, Tdoc R3-182200, 3GPP.
3rd Generation Partnership Project, "3rd Generation Partnership Project; Technical Specification Group Radio Access Network; Evolved Universal Terrestrial Radio Access Network (E-UTRAN); X2 application protocol (X2AP) (Release 15)", Technical Specification, 3GPP TS 36.423 V15.5.0, Mar. 2019, pp. 1-414, 3GPP, France.
3rd Generation Partnership Project, "3rd Generation Partnership Project; Technical Specification Group Services and System Aspects; 3GPP System Architecture Evolution (SAE); Security architecture (Release 15)", Technical Specification, 3GPP TS 33.401 V15.7.0, Mar. 2019, pp. 1-163, 3GPP, France.
3rd Generation Partnership Project, "3rd Generation Partnership Project; Technical Specification Group Radio Access Network; Evolved Universal Terrestrial Radio Access (E-UTRA) and NR; Multi-connectivity; Stage 2 (Release 15)", Technical Specification, 3GPP TS 37.340 V15.5.0, Mar. 2019, pp. 1-68, 3GPP, France.
3rd Generation Partnership Project, "3rd Generation Partnership Project; Technical Specification Group Radio Access Network; NG-RAN; NG Application Protocol (NGAP) (Release 15)", Technical Specification, 3GPP TS 38.413 V15.3.0, Mar. 2019, pp. 1-319, 3GPP, France.
3rd Generation Partnership Project, "3rd Generation Partnership Project; Technical Specification Group Radio Access Network; NG-RAN; Architecture description (Release 15)", Technical Specification, 3GPP TS 38.401 V15.5.0, Mar. 2019, pp. 1-39, 3GPP, France.
3rd Generation Partnership Project, "3rd Generation Partnership Project; Technical Specification Group Radio Access Network; NR; NR and NG-RAN Overall Description; Stage 2 (Release 15)", Technical Specification, 3GPP TS 38.300 V15.5.0, Mar. 2019, pp. 1-97, 3GPP, France.
3rd Generation Partnership Project, "3rd Generation Partnership Project; Technical Specification Group Radio Access Network; NR; Medium Access Control (MAC) protocol specification (Release 15)", Technical Specification, 3GPP TS 38.321 V15.5.0, Mar. 2019, pp. 1-78, 3GPP, France.
3rd Generation Partnership Project, "3rd Generation Partnership Project; Technical Specification Group Radio Access Network; NR; Radio Resource Control (RRC) protocol specification (Release 15)", Technical Specification, 3GPP TS 38.331 V15.5.0, Mar. 2019, pp. 1-491, 3GPP, France.

* cited by examiner

| IE/Group Name | Presence | Range | IE type and reference | Semantics description |
|---|---|---|---|---|
| Xn Transport Layer Addresses | | 1..<maxnoofXnTLAs> | | |
| >Transport Layer Address | M | | 9.3.2.4 | Transport Layer Addresses for Xn SCTP endpoint. |
| Xn Extended Transport Layer Addresses | | 0..<maxnoofXnExtTLAs> | | |
| >IP-Sec Transport Layer Address | O | | Transport Layer Address 9.3.2.4 | Transport Layer Addresses for IP-Sec endpoint. |
| > Xn GTP Transport Layer Addresses | | 0..<maxnoofXnGTP-TLAs> | | |
| >>GTP Transport Layer Address | M | | Transport Layer Address 9.3.2.4 | GTP Transport Layer Addresses for GTP end-points (used for data forwarding over Xn). |

FIG. 7

| I/E Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU EU F1AP ID | M | | 9.3.1.4 | | YES | reject |
| gNB-DU EU F1AP ID | O | | 9.3.1.5 | | YES | ignore |
| SpCell ID | M | | NR CGI 9.3.1.12 | | YES | reject |
| ServCellIndex | M | | INTERGER (0..31) | Special Cell as defined in TS 38.321 [16]. For handover case, this IE shall be considered as target cell. | YES | reject |
| SpCell UL Configured | O | | Cell UL Configured 9.3.1.33 | | YES | ignore |
| CU to DU RRC Information | M | | 9.3.1.25 | | YES | reject |
| Candidate SpCell List | | 0..1 | | | YES | ignore |
| >Candidate SpCell Item IEs | | 1..<maxnoofCandidateSpCells> | | | EACH | — |
| >>Candidate SpCell ID | M | | NR CGI 9.3.1.12 | Special Cell as defined in TS 38.321 [16] | — | |
| DRX Cycle | O | | DRX Cycle 9.3.1.24 | | YES | ignore |
| Resource Coordination Transfer Container | O | | OCTET STRING | Includes the *MeNB Resource Coordination Information* IE as defined in subclause 9.2.116 of TS 36.423 [9]. | YES | ignore |

FIG. 8A

| IE Group Name | Presence | Range | IE type and reference | Semantics description | Criticality | Assigned Criticality |
|---|---|---|---|---|---|---|
| SCell To Be Setup List | | 0..1 | | | YES | ignore |
| >SCell to Be Setup Item IEs | | 1 .. <maxnoofSCells> | | | EACH | ignore |
| >>SCell ID | M | | NR CGI 9.3.1.12 | SCell Identifier in gNB | - | |
| >>SCellIndex | M | | INTERGER (0..31) | | - | |
| >>Scell UL Configured | O | | Cell UL Configured 9.3.1.33 | | - | |
| >>servingCellMO | O | | INTERGER (0..64) | | YES | ignore |
| SRB to Be Setup List | | 0..1 | | | YES | reject |
| >SRB to Be Setup Item IEs | | 1 .. <maxnoofSRBs> | | | EACH | reject |
| >>SRB ID | M | | 9.3.1.7 | | - | |
| >>Duplication Indication | O | | ENUMERATED (true, ..., false) | If included, it should be set to true | YES | ignore |

FIG. 8B

| IE/Group Name | Presence | Range | IE type and reference | Semantics description | Criticality | Assigned Criticality |
|---|---|---|---|---|---|---|
| DRB to Be Setup List | | 0..1 | | | YES | reject |
| >DRB to Be Setup Item IEs | | 1.. <maxnoofSRBIs> | | | EACH | reject |
| >>DRB ID | M | | 9.3.1.8 | | – | |
| >>CHOICE QoS Information | M | | | | – | |
| >>>E-UTRAN QoS | | | 9.3.1.19 | Shall be used for EN-DC case to convey E-RAB Level QoS Parameters | – | |
| >>>DRB Information | | | | Shall be used for NG-RAN cases | YES | ignore |
| >>>>DRB QoS | M | | 9.3.1.45 | | – | |
| >>>>S-NSSAI | M | | 9.3.1.38 | | – | |
| >>>>Notification Control | O | | 9.3.1.56 | | – | |
| >>>>Flows Mapped to DRB Item | | 1.. <maxnoofQ oSFlows> | | | – | |
| >>>>>QoS Flow Identifier | M | | 9.3.1.63 | | – | |
| >>>>>QoS Flow Level QoS Parameters | M | | 9.3.1.45 | | – | |
| >>>>>QoS Flow Mapping Indication | O | | 9.3.1.72 | | – | |
| >>UL UP TNL Information to be setup List | | 1 | | | YES | ignore |
| >>>UL UP TNL Information to be setup Item IEs | | 1.. <maxnoofUL UPTNLInformation> | | | – | |
| >>>>UL UP TNL Information | M | | UP Transport Layer Information 9.3.2.1 | gNB-CU endpoint of the F1 transport bearer. For delivery of UL PDUs | – | |

FIG. 8C

| I/E Group Name | Presence | Range | IE type and reference | Semantics description | Criticality | Assigned Criticality |
|---|---|---|---|---|---|---|
| >>RLC Mode | M | | 9.3.1.27 | | – | |
| >>UL Configuration | O | | UL Configuration 9.3.1.31 | Information about UL usage in gNB-DU | – | |
| >>Duplication Activation | O | | 9.3.1.36 | Information on the initial state of CA based UL PDCP duplication | – | |
| >>DC Based Duplication Configuration | O | | ENUMERATED (true, ..., false) | Indication on whether DC based PDCP duplication is configured or not. If included, it should be set to true | YES | reject |
| >>DC Based Duplication Activation | O | | Duplication Activation 9.3.1.36 | Information on the initial state of DC based UL PDCP duplication | YES | reject |
| >>DL PDCP SN length | M | | ENUMERATED (12bits, 18bits, ...) | | YES | ignore |
| >>UL PDCP SN length | O | | ENUMERATED (12bits, 18bits, ...) | | YES | ignore |

FIG. 8D

| I/E Group Name | Presence | Range | IE type and reference | Semantics description | Criticality | Assigned Criticality |
|---|---|---|---|---|---|---|
| Inactivity Monitoring Request | O | | ENUMERATED (true, ..., false) | | YES | reject |
| RAT-Frequency Priority Information | O | | 9.3.1.34 | | YES | reject |
| RRC-Container | O | | 9.3.1.6 | Includes the DL-DCCH-Message IE as defined in subclause 6.2 of TS 38.331 [8], encapsulated in a PDCP PDU | YES | reject |
| Masked IMEISV | O | | 9.3.1.55 | | YES | reject |
| Serving PLMN | O | | PLMN ID 9.3.1.14 | Indicates the PLMN serving the UE | YES | ignore |
| gNB-DU UE Aggregate Maximum Bit Rate Uplink | C-ifDRBSetup | | Bit Rate 9.3.1.22 | The gNB-DU UE Aggregate Maximum Bit Rate Uplink is to be enforced by the gNB-DU | YES | ignore |
| RRC Delivery Status Request | O | | ENUMERATED (true, ..., false) | Indicates whether RRC DELIVERY REPORT procedure is requested for the RRC message. | YES | ignore |
| Resource Coordination Transfer Information | O | | 9.3.1.73 | | YES | ignore |
| servingCellMO | O | | INTERGER (0..64) | | YES | ignore |

FIG. 8E

| IE/Group Name | Presence | Range | IE type and reference | Semantics description | Criticality | Assigned Criticality |
|---|---|---|---|---|---|---|
| Message Type | M | | 9.3.1.1 | | YES | reject |
| gNB-CU EU F1AP ID | M | | 9.3.1.4 | | YES | reject |
| gNB-DU EU F1AP ID | M | | 9.3.1.5 | | YES | reject |
| DU to CU RRC Information | M | | 9.3.1.26 | | YES | reject |
| C-RNTI | O | | 9.3.1.32 | C-RNTI allocated at the gNB-DU | YES | ignore |
| Resource Coordination Transfer Container | O | | OCTET STRING | Includes the *SgNB Resource Coordination Information* IE as defined in subclause 9.2.117 of TS 36.423 [9] | YES | ignore |
| Full Configuration | O | | ENUMERATED (full, ...) | | YES | reject |
| DRB Setup List | | 0..1 | | The List of DRBs which are successfully established | YES | ignore |
| >DRB Setup Item List | | 1 .. <maxnoofDRBs> | | | EACH | ignore |
| >>DRB ID | M | | 9.3.1.8 | | – | |
| >>LCID | O | | 9.3.1.35 | LCID for the primary path if PDCP duplication is applied | – | |
| >>DL UP TNL Information to be Setup List | | 1 | | | – | |
| >>>DL UP TNL Information to be Setup Item IEs | | 1 .. <maxnoofDLUPTNLInformation> | | Shall be used for NG-RAN cases | – | |
| >>>>DL UP TNL Information | M | | UP Transport Layer Information 9.3.2.1 | gNB-DU endpoint of the F1 transport bearer. For delivery of DL PDUs | | |

FIG. 9A

| IE Group Name | Presence | Range | IE type and reference | Semantics description | Criticality | Assigned Criticality |
|---|---|---|---|---|---|---|
| SRB Faiedl to Setup List | | 0..1 | | | YES | ignore |
| >SRB Failed to Setup Item | | 1..<maxnoofSRBs> | | | EACH | ignore |
| >>SRB ID | M | | 9.3.1.7 | | – | |
| >>Cause | O | | 9.3.1.2 | | – | |
| DRB Failed to Setup List | | 0..1 | | | YES | ignore |
| >DRB Failed to Setup Item | | 1..<maxnoofDRBs> | | | EACH | ignore |
| >>DRB ID | M | | 9.3.1.8 | | – | |
| >>Cause | O | | 9.3.1.2 | | – | |
| SCell Failed to Setup List | | 0..1 | | | YES | ignore |
| >SCell Failed to Setup Item | | 1..<maxnoofSCells> | | | EACH | ignore |
| >>SCell ID | M | | NR CGI 9.3.1.12 | SCell Identifier in gNB | – | |
| >>Cause | O | | 9.3.1.2 | | – | |
| Inactivity Monitoring Request | O | | ENUMERATED (not supported, ...) | | YES | reject |
| Criticality Diagnostics | O | | 9.3.1.3 | | YES | ignore |

FIG. 9B

| IE Group Name | Presence | Range | IE type and reference | Semantics description | Criticality | Assigned Criticality |
|---|---|---|---|---|---|---|
| SRB Setup List | | 0..1 | | The List of DRBs which are successfully established | YES | ignore |
| >SRB Setup Item | | 1.. \<maxnoofSRBs\> | | | EACH | ignore |
| >>DRB ID | M | | 9.3.1.7 | | – | |
| >>LCID | M | | 9.3.1.35 | LCID for the primary path if PDCP duplication is applied | – | |

FIG. 9C

USER PLANE SECURITY IN SPLIT RAN ARCHITECTURES

RELATED APPLICATIONS

This application claims the benefit of U.S. Provisional Application No. 62/843,292, filed 3 May 2019, the entire disclosure of which is hereby incorporated by reference herein.

TECHNICAL FIELD

The present disclosure generally relates to wireless communication networks, and more particularly relates to efficiently establishing security over the user plane (UP) of a Radio Access Network (RAN) in which the UP and the Control Plane (CP) have been split.

BACKGROUND

In a traditional Next Generation (NG) RAN architecture, direct Internet Protocol (IP) Security (IPsec) connections for UP interfaces cannot be set up autonomously (e.g., without heavy manual configuration). In such existing architectures, securing the UP interfaces generally requires routing the traffic via a security gateway in a preconfigured way. Depending on where the Security Gateway is in relationship to the split NG-RAN deployment, this may result in considerable latency and a lot of aggregated traffic on the backhaul. Further, the performance requirements for establishment of a UP interface are very strict. Solutions that would impact the timely establishment of UP connections would be suboptimal. Given that the performance of various services depends on the well-functioning of the UP interfaces, it would be advantageous to establish the UP interface with the lowest possible latency.

SUMMARY

Particular embodiments of the present disclosure enable secured connections (e.g., via IPSec) between RAN nodes in a way that can be dynamically configured and are not affected by long establishment delays. The embodiments discussed herein may be applied to any RAN in which UP connections need to be secured. In particular, embodiments may be applied to NG-RAN nodes arranged accordingly to a split RAN architecture or to E-UTRAN nodes (e.g., eNBs) not subject to split architectures. Many of the examples presented herein describe embodiments that refer to an NR gNB following a high layer split architecture. However, other embodiments may be applied to other types of nodes and architectures in a substantially similar way.

One or more of the embodiments discussed herein may provide significantly improved latency by allowing direct tunneling between network nodes for the secured UP interfaces, which removes the Security Gateway that might otherwise be present from the path. Thus, latency is reduced or minimized, backhaul resources are saved, and/or security is preserved. Further, the secure tunnel for the UP interface may, in some embodiments, be setup automatically before any Data Radio Bearer (DRB) is setup, which may decrease DRB setup time.

Accordingly, particular embodiments of the present disclosure include a method of providing user plane security performed by a network node of a radio access network (RAN) of a wireless communication network. The method comprises establishing a secure tunnel between first and second tunnel endpoints that will handle respective protocol layers of a same protocol stack for a Data Radio Bearer (DRB) that is dedicated to user plane traffic and has yet to be established. Establishing the secure tunnel comprises exchanging an inner Internet Protocol (IP) address and an outer IP address of each of the endpoints between the endpoints.

In some embodiments, the method further comprises hosting the first tunnel endpoint, wherein the second tunnel endpoint is hosted by a further network node. In some such embodiments, the method further comprises supporting, along with the further network node, a dual connectivity configuration of a User Equipment (UE) in which one of the network nodes is a master node and the other of the network nodes is a secondary node. In some embodiments, establishing the secure tunnel additionally or alternatively comprises establishing the secure tunnel over a backhaul interface between the network nodes.

In other embodiments, the method further comprises hosting the first tunnel endpoint and the second tunnel endpoint.

In some embodiments, exchanging the inner IP address and the outer IP address of each of the endpoints between the endpoints comprises exchanging the inner and outer IP addresses via an intermediary. In some such embodiments, the method further comprises hosting the intermediary. In some such embodiments, the intermediary is a Central Unit Control Plane (CU-CP).

In some embodiments, one of the endpoints is a Central Unit User Plane (CU-UP).

In some embodiments, one of the endpoints is a Distributed Unit (DU).

In some embodiments, the method further comprises using the secure tunnel to establish the DRB for the user plane traffic.

In some embodiments, the method further comprises establishing, over the secure tunnel, a further tunnel from the network node to a core network supporting the RAN.

In some embodiments, one of the endpoints will handle a Packet Data Convergence Protocol (PDCP) layer for the DRB and the other of the endpoints will handle a Radio Link Control (RLC) layer for the DRB.

In some embodiments, exchanging the inner IP address and the outer IP address of each of the endpoints between the endpoints comprises exchanging the inner and outer IP address of at least one of the endpoints during setup of an E1 interface. In other embodiments, exchanging the inner IP address and the outer IP address of each of the endpoints between the endpoints comprises exchanging the inner and outer IP address of at least one of the endpoints during setup of an X2 interface. In yet other embodiments, exchanging the inner IP address and the outer IP address of each of the endpoints between the endpoints comprises exchanging the inner and outer IP address of at least one of the endpoints during setup of an Xn interface.

In some embodiments, exchanging the inner IP address and the outer IP address of each of the endpoints between the endpoints comprises exchanging the inner and outer IP address of one of the endpoints during setup of an F1 interface.

Other embodiments include a network node of a radio access network (RAN) of a wireless communication network. The network node is configured to establish a secure tunnel between first and second tunnel endpoints that will handle respective protocol layers of a same protocol stack for a Data Radio Bearer (DRB) that is dedicated to user plane traffic and has yet to be established. To establish the secure tunnel, the network node is configured to exchange an inner Internet Protocol (IP) address and an outer IP address of each of the endpoints between the endpoints.

In some embodiments, the network node is further configured to perform any of the methods described above.

In some embodiments, the network node comprises processing circuitry and a memory, the memory containing instructions executable by the processing circuitry, whereby the network node is configured.

Yet other embodiments include a computer program, comprising instructions which, when executed on processing circuitry of a network node, cause the processing circuitry to carry out any of the methods described above.

Other embodiments include a carrier containing the computer program of the preceding embodiment, wherein the carrier is one of an electronic signal, optical signal, radio signal, or computer readable storage medium.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter according to one or more embodiments, whereas discussion of a specific instance of an illustrated element will append a letter designation thereto (e.g., discussion of a gNB 130, generally, as opposed to discussion of particular instances of gNBs 130*a*, 130*b*).

FIG. 7 is a table illustrating an example definition of an information element (IE) useful for signaling configuration information, according to one or more embodiments of the present disclosure.

FIGS. 8A-8E are tables that collectively illustrate an example definition of a message to request setup of a User Equipment (UE) context, according to one or more embodiments of the present disclosure.

FIG. 9A-9C are tables that collectively illustrate an example definition of a message to confirm the setup of a UE context, according to one or more embodiments of the present disclosure.

DETAILED DESCRIPTION

Figure 1:
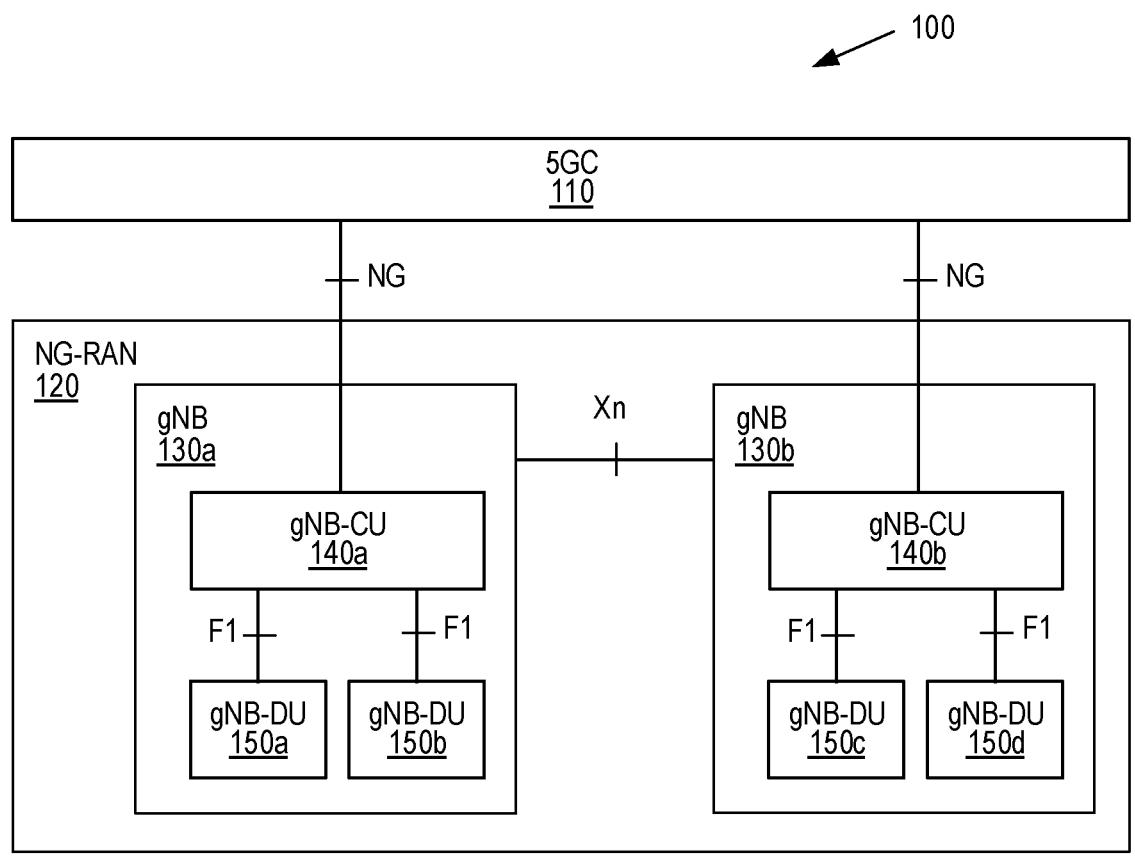
FIG. 1 is a schematic block diagram illustrating an example NG architecture, according to one or more embodiments of the present disclosure.

Fourth Generation (4G) networks are now widely deployed and the Third Generation Partnership Project (3GPP) is currently developing the standards for Fifth Generation (5G) systems. Embodiments of the present disclosure are compatible with both 4G and 5G networks. Both 4G and 5G networks include a RAN and a core network. A version of the 5G RAN (i.e., an NG-RAN) architecture is depicted and described in TS 38.401 v15.5.0. An example of the NG architecture 100 is illustrated in FIG. 1.

In this example, the NG-RAN 120 consists of a set of gNodeBs (gNBs) 130*a*, 130*b* connected to the 5G Core (5GC) 110 through the NG interface. A gNB 130 can support Frequency Division Duplexing (FDD) mode, Time Division Duplexing (TDD) mode or dual mode operation. The gNBs 130*a*, 130*b* are interconnected through the Xn interface. As shown in this example, the gNBs 130*a*, 130*b* may comprise gNB Central Units (gNB-CUs) 140 and gNB Distributed Units (gNB-DUs) 150. A gNB-CU and a gNB-DU are connected to each other via an F1 logical interface. In this example, each gNB-DU 150*a-d* is connected to only one gNB-CU 140*a-b*. However, in other embodiments, a gNB-DU 150 may be connected to multiple gNB-CUs 140, e.g., for resiliency purposes.

The NG, Xn and F1 interfaces are logical interfaces. The NG-RAN 120 is layered into a Radio Network Layer (RNL) and a Transport Network Layer (TNL). The NG-RAN architecture (i.e., the NG-RAN logical nodes and interfaces between them) is defined as part of the RNL. For each NG-RAN interface (NG, Xn, F1) the related TNL protocol and functionality are specified. The TNL provides services for UP transport and signaling transport. If security protection for CP and UP data on the TNL of NG-RAN interfaces has to be supported, Network Domain Security/Internet Protocol (NDS/IP) is applied (e.g., as in 3GPP TS 33.401).

A gNB 130 may also be connected to a Long Term Evolution (LTE) eNodeB (eNB) via the X2 interface. Another architectural option includes an LTE eNB connected to an Evolved Packet Core (EPC) network and to a so-called en-gNB over the X2 interface. An en-gNB is a gNB 130 that is not connected directly to a Core Network (CN) and is connected via an X2 interface to an eNB for the sole purpose of performing dual connectivity.

Figure 2:
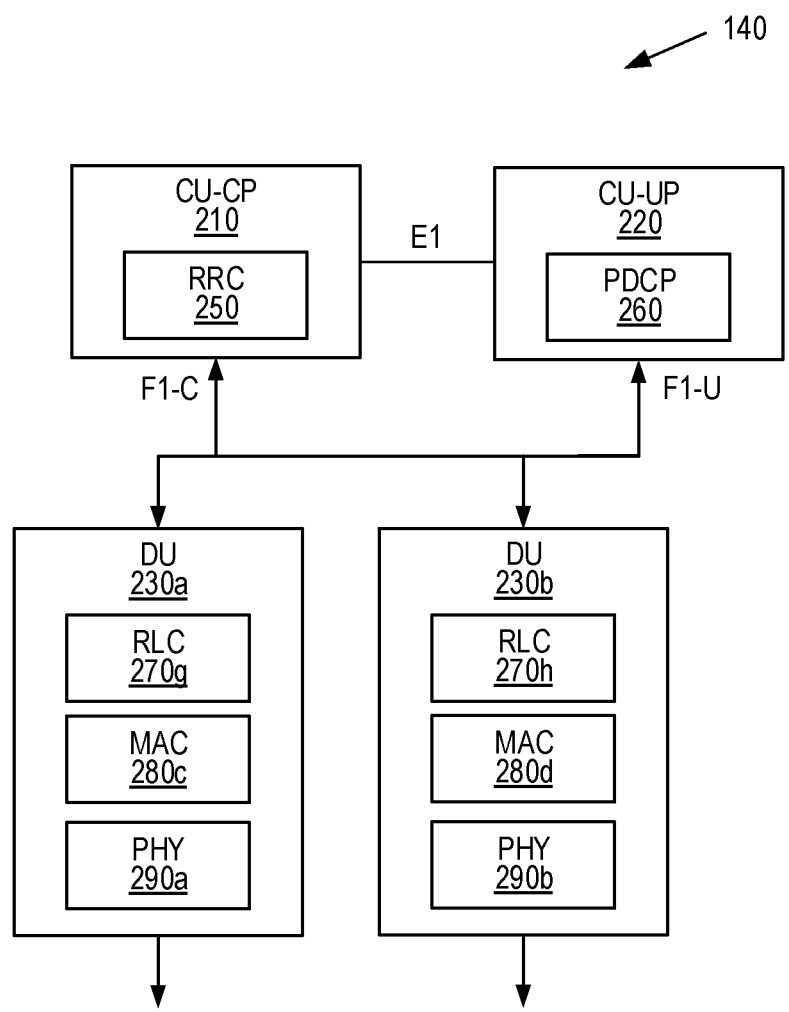
FIG. 2 is a schematic block diagram illustrating an example split gNB Control Unit, according to one or more embodiments of the present disclosure.

The NG architecture 100 illustrated in FIG. 1 can be expanded by splitting a gNB-CU 140 into two entities. FIG. 2 illustrates an example split gNB-CU. In this split architecture option, the RAN protocol stack functionality is separated into different parts. The Central Unit Control Plane (CU-CP) 210 handles the Radio Resource Control (RRC) 250 layer, the Central Unit User Plane (CU-UP) 220 handles the Packet Data Convergence Protocol (PDCP) 260 layer, and a Distributed Unit (DU) 230*a* handles the Radio Link Control (RLC) 270*g*, 270*h*, Media Access Control (MAC), 280*c*, 280*d*, and Physical (PHY) 290*a*, 290*b* layers of the protocol stack. In some embodiments involving a further split, a separate DU 230*b* can handle the PHY 290*b* layer separately from the RLC 270*g* and MAC 280*c* layers that are handled in the DU 230*a*, or vice versa (i.e., the DU 230*a* may handle the PHY 290*a* layer separately from the RLC 270*h* and MAC 280*d* layers that are handled in the DU 230*b*.

As different units handle different protocol stack functionalities, inter-node communication between the DU 230, the CU-UP 220, and the CU-CP 210 will be required. This is achieved via the F1-C interface related to control plane signaling, via the F1-U interface related to user plane signaling for communication between CU-UP 220 and DU 230, and via the E1 interface for communication between CU-UP 220 and CU-CP 210.

The E1 interface is a logical interface that supports the exchange of signaling information between its endpoints. From a logical standpoint, the E1 is a point-to-point interface between a gNB-CU-CP and a gNB-CU-UP. The E1 interface enables exchange of UE associated information and non-UE associated information. The E1 interface is a control interface and is not used for user data forwarding.

Figure 3:
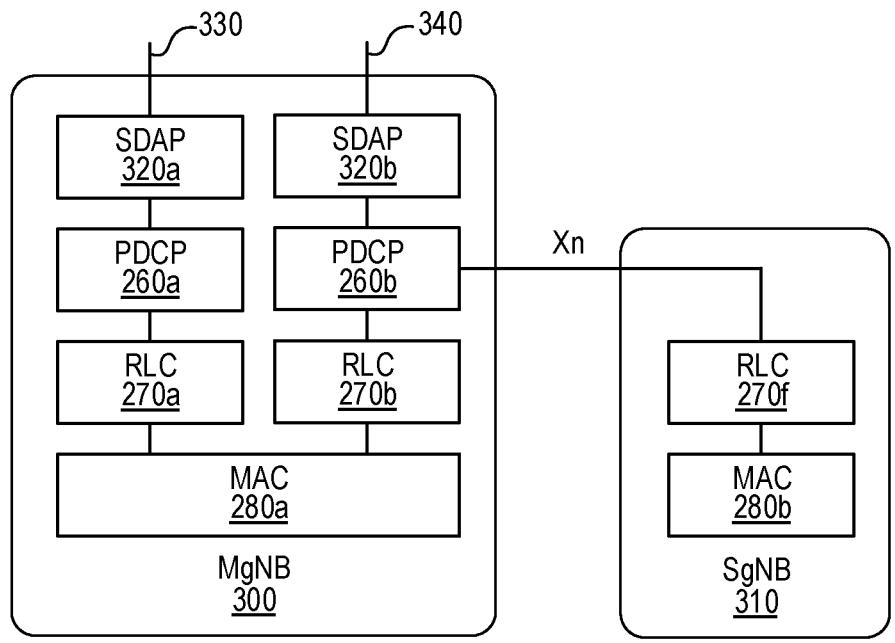
FIG. 3 is a schematic block diagram illustrating an example Master gNB supporting dual connectivity, according to one or more embodiments of the present disclosure.
Figure 4:
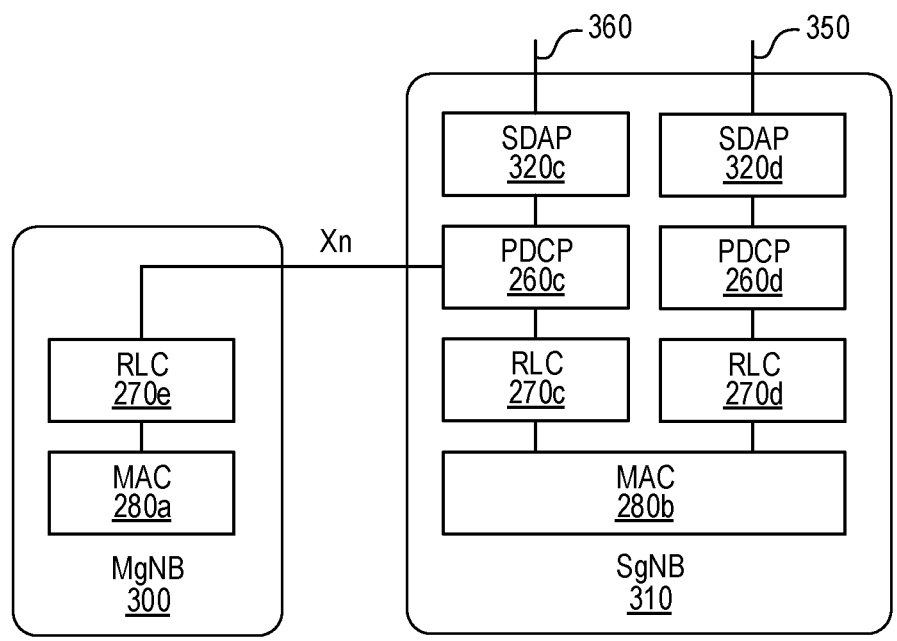
FIG. 4 is a schematic block diagram illustrating an example Secondary gNB supporting dual connectivity, according to one or more embodiments of the present disclosure.

In the context of 5G RAN architectures, dual connectivity (DC) is supported. Such mechanism consists of establishing master and secondary nodes and distributing user plane (UP) traffic to the master node (MN) and secondary nodes (SNs) according to traffic and radio resource management that intends to provide the best possible distribution. CP traffic is assumed to terminate in one node only, i.e., the MN. FIGS. 3 and 4 show the protocol and interfaces involved in dual connectivity, e.g., in a manner consistent with the provisions of TS38.300 v15.5.0.

It is worth noting that DC configurations could also involve an eNB supporting Evolved Universal Mobile Telecommunications System (UMTS) Terrestrial Radio Access (E-UTRA). This could either happen in an NG-RAN system (where the eNB could be either MN or SN) or in an E-UTRA RAN (E-UTRAN) system (where the eNB is an MN and the gNB is an SN).

FIG. 3 shows an example of a Master gNB (MgNB) 300 and a Secondary gNB (SgNB) 310 supporting dual connectivity for a UE (not shown). The MgNB 300 supports a Master Cell Group (MCG) bearer 330 and an MCG split bearer 340. Each of the bearers 330, 340 is handled by respective Service Data Adaptation Protocol (SDAP) 320*a*, 320*b*, PDCP 260*a*, 260*b*, and RLC 270*a*, 270*b* layers in the MgNB 300. Both of the bearers 330, 340 are also handled by a MAC layer 280*a* of the MgNB 300. With respect to the MCG Split Bearer 340, the MgNB 300 is able to forward traffic from the PDCP 260*b* layer to the SgNB 310, where the forwarded traffic is handled by RLC 270*f* and MAC 280*b* layers of the SgNB 310. In this regard, the MCG Split Bearer traffic forwarded to the SgNG 310 may be a duplicate of the traffic kept by the MgNB 300 and handled by the RLC 270*b* and MAC 280*a* layers so that the dual connectivity may improve the reliability of that traffic arriving at a UE. Alternatively, the traffic that is forwarded may be different from the traffic that the dual connectivity may improve the throughput provided to the UE.

FIG. 4 again shows another example of an MgNB 300 and a SgNB 310 supporting dual connectivity for a UE (not shown). In this example, the SgNB 310 supports a Secondary Cell Group (SCG) bearer 350 and an SCG Split Bearer 360. The SgNB 310 forwards PDCP bearer traffic from the SCG Split Bearer 360 to the MgNB 300. In some embodiments, the MgNB 300 and/or SgNB 310 may be subject to the RAN split architecture outlined above and comprise CUs 210, 220 and DUs 230.

Figure 5:
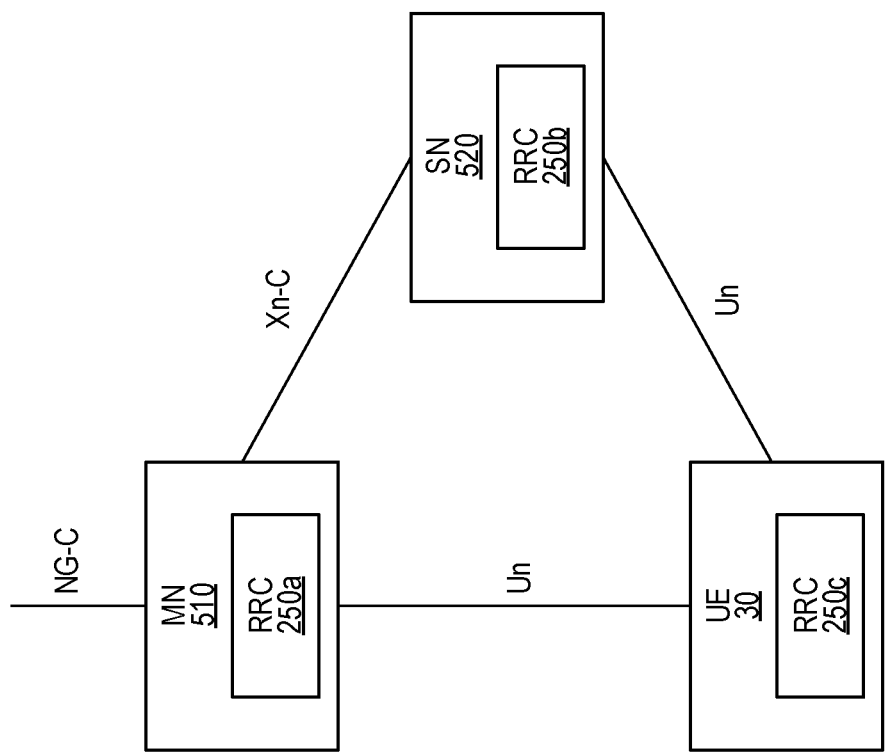
FIG. 5 is a schematic block diagram illustrating an example of Multi-Radio Access Technology (RAT) Dual Connectivity (MR-DC), according to one or more embodiments of the present disclosure.

Furthermore, in the context of 5G standardization, multi-RAT dual connectivity (MR-DC) is being standardized. FIG. 5 illustrates an example of MR-DC in which a UE 30 is in dual connectivity with an MN 510 and an SN 520. Each of the MN 510, SN 520, and UE 30 comprises a respective RRC 250*a*, 250*b*, 250*c* layer. The MN 510 anchors the control plane towards the Core Network (CN), to which it is connected on the NG-C interface. The SN 520 provides control and user plane resources to the UE 30 via coordination with the MN 510 over the Xn-C interface (see also, e.g., TS 37.340). Although the UE 30 is in dual connectivity with the MN 510 and the SN 520, the RRC state of the RRC layer 250*c* of the UE 30 is based on the MN 510, which anchors the control plane.

Figure 6:
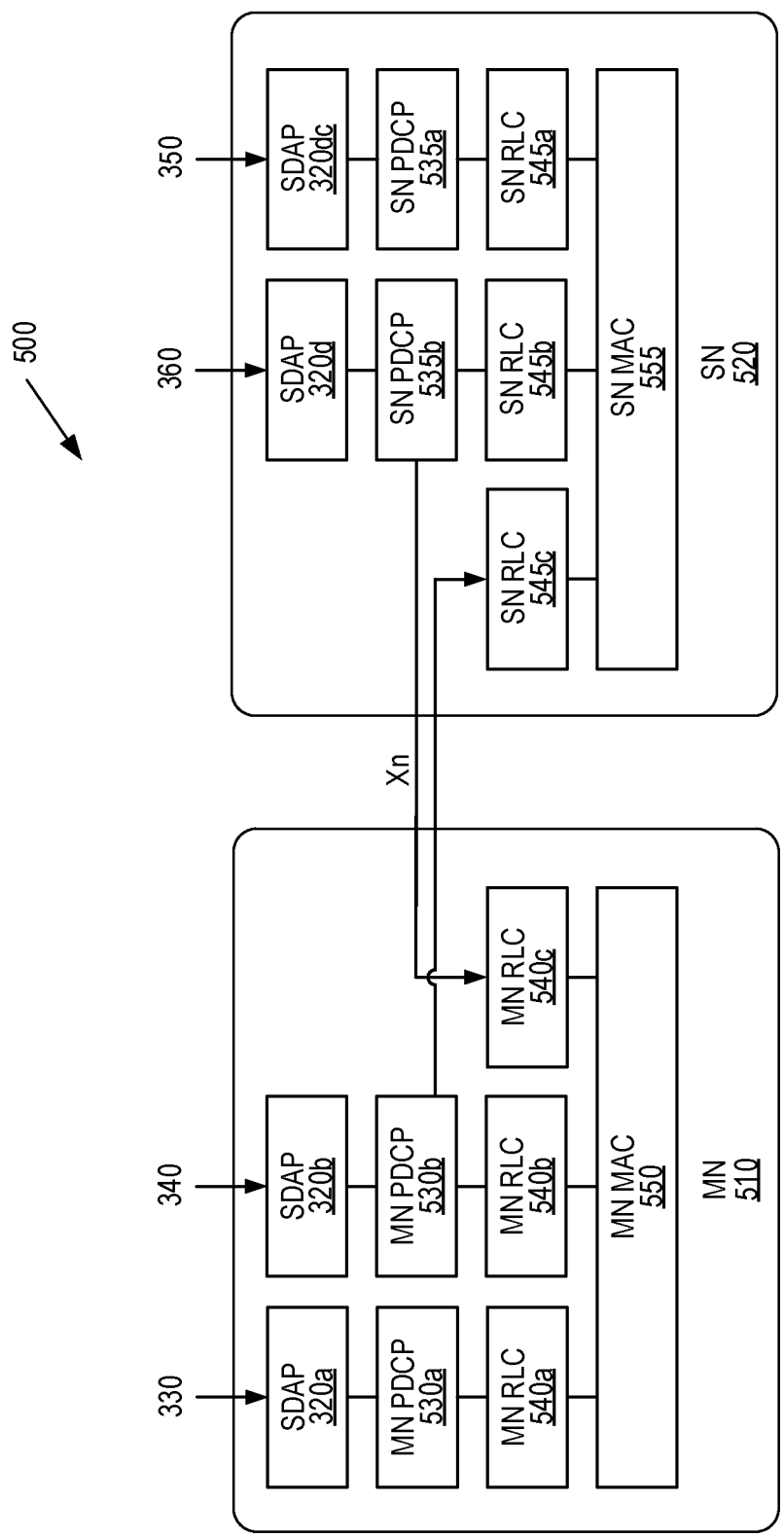
FIG. 6 is a schematic block diagram illustrating an example radio protocol architecture supporting MR-DC, according to one or more embodiments of the present disclosure.

Various user plane/bearer type solutions are possible in MR-DC. An example of a Radio Protocol Architecture 500 providing such a solution is shown in FIG. 6 (see also, e.g., TS 37.340). As shown in FIG. 6, the MN 510 supports an MCG bearer 330 and an MCG Split Bearer 340, whereas the SN 520 supports an SCG Bearer 350 and an SCG Split Bearer 360.

The MCG bearer 330 and MCG Split Bearer 340 are handled by respective SDAP 320*a*, 320*b*, MN PDCP 530*a*, 530*b*, and MN RLC 540*a*, 540*b* layers. The MCG bearer 330 and MCG Split Bearer 340 are also handled by an MN MAC 550 layer. In this regard, layers denoted as "MN" layers as so noted because the processing performed by those layers in particular may vary depending on the RAT of the MN 510 (e.g., the type of PDCP, RLC, and/or MAC being performed may be different depending on whether the MN 510 is an MgNB 300, and LTE eNB, or some other kind of RAN node).

The SCG bearer 350 and SCG Split Bearer 360 are handled by respective SDAP 320*c*, 320*d*, SN PDCP 530*c*, 530*d*, and SN RLC 540*c*, 540*d* layers. The SCG bearer 350 and SCG Split Bearer 360 are also handled by an SN MAC 555 layer. In this regard, layers denoted as "SN" layers as so noted because the processing performed by those layers in particular may vary depending on the RAT of the SN 520 (e.g., the type of PDCP, RLC, and/or MAC being performed may be different depending on whether the SN 520 is an SgNB 310, and LTE eNB, or some other kind of RAN node).

The MN 510 also has an MN RLC 540*c* layer that handles traffic transferred, via the Xn interface, from the SN PDCP 535*b* layer handling the SCG Split Bearer 360. Similarly, the SN 520 has an MN RCL 545*c* layer that handles traffic transferred, via the Xn interface, from the MN PDCP 530*b* layer handling the MCG Split Bearer 340.

TS 38.401 is the 3GPP specification designated for describing overall procedures (including signaling flows) in gNB-CU 140/gNB-DU 150 architecture, e.g., initial access from the UE 30, inter-DU mobility, etc. In mobility procedures, for example, techniques for avoiding data loss during handover (HO) will be included.

IP Security (IPSec) tunnels may be used to secure UP connections. In LTE, for example, IPSec is established to secure the X2-U connection between two eNBs. An exchange of inner and outer IP addresses takes place between the eNBs during the IPSec setup. The outer addresses are the addresses used to establish an IPSec tunnel as well as the addresses contained in the outmost IP header of the packets exchanged across the IPSec tunnel between the tunnel endpoints. The inner addresses are IP addresses contained in the IP header of packets transported within the outer IP header packets.

According to embodiments, the Self Organizing Network (SON) Configuration Transfer Information Element (IE) includes the Xn TNL Configuration Info IE, which may be defined as in TS 38.413 § 9.3.3.9, or as shown in the table of FIG. 7. This IE may be used for signaling Xn TNL Configuration information for automatic Xn Stream Control Transmission Protocol (SCTP) association establishment.

In a traditional NR split architecture 100, only the inner (Uplink (UL) UP TNL Information IE from CU 140 and Downlink (DL) UP TNL Information IE from DU 150) are provided at Data Radio Bearer (DRB) setup and modification via the F1 interface's UE Context Setup and F1 interface's UE Context Modification procedures (i.e., both CU 140 and DU 150 initiated). For example, the UE CONTEXT SETUP REQUEST message (sent from the gNB-CU 140a to the gNB-DU 150a to request setup of a UE context) may be as shown in FIGS. 8A-8E. Correspondingly, the UE CONTEXT SETUP RESPONSE message (sent from the gNB-DU 150a to the gNB-CU 140a to confirm the setup of the UE context) may be as shown in FIGS. 9A-9C.

Figure 10:
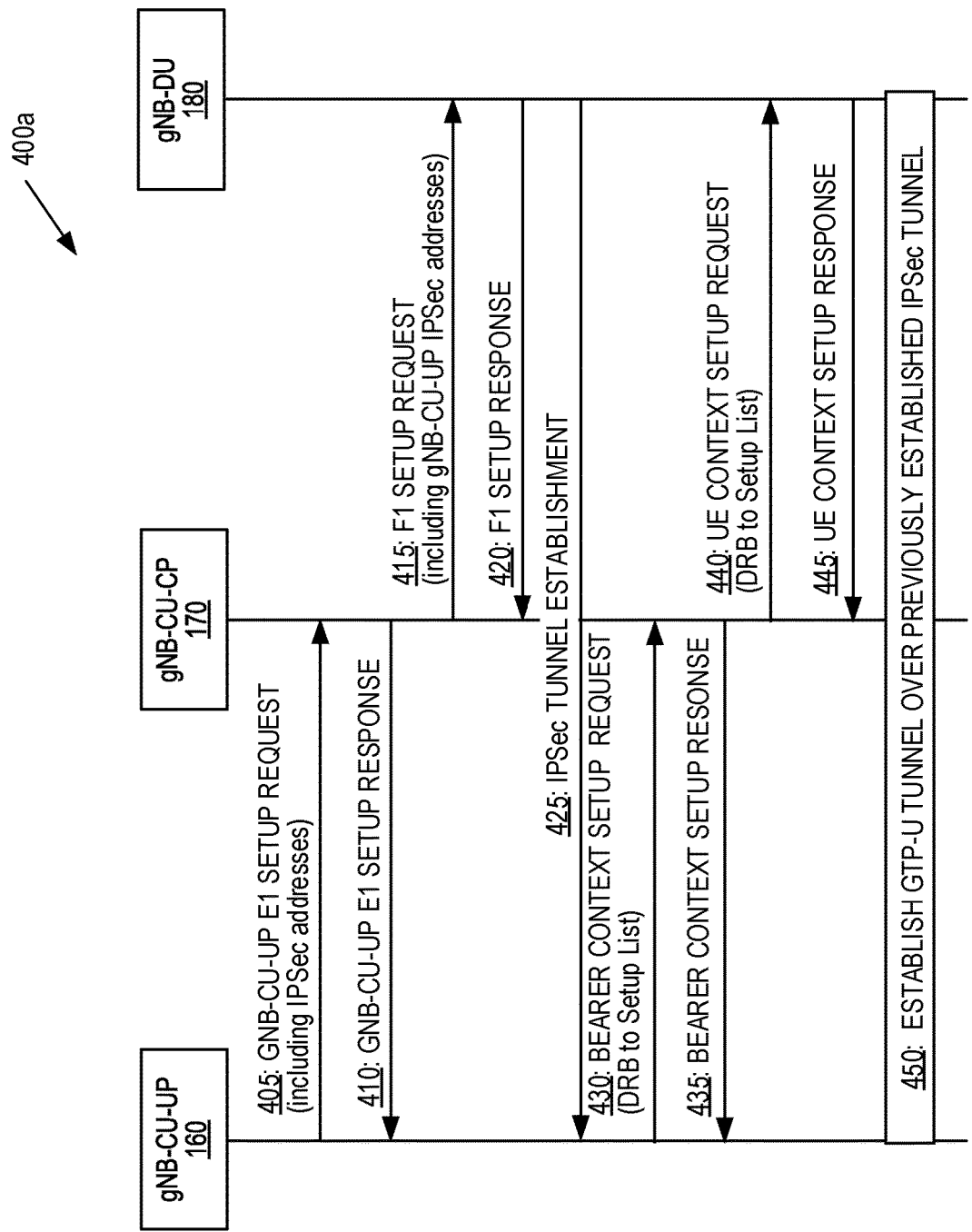
FIG. 10 and FIG. 11 are a signaling diagrams illustrating respective examples of a secure tunnel establishment procedure, according to embodiments of the present disclosure.

Various embodiments of the present disclosure enable exchange of inner and outer User Plane IP addresses between a node handling upper layer processing (e.g., PDCP 260 layer processing) for a bearer 330, 340, 350, 360 and a node handling lower layer processing (e.g., RLC 270 and/or MAC 280 layer processing) for the bearer 330, 340, 350, 360 so that a secure tunnel between the nodes may be timely established (e.g., before DRB setup). FIG. 10 illustrates an example of such embodiments. According to the example tunnel establishment procedure 400a of FIG. 10, a gNB-CU-UP 160 and gNB-DU 180 exchange inner and outer User Plane IP addresses.

These addresses may be exchanged, according to embodiments, at F1-C interface setup, F1-C interface update, E1 interface setup, and/or E1 interface update, e.g., so that a direct IPsec connection can be setup over the User Plane interfaces between the nodes. In some embodiments, these User Plane interfaces include the Xn interface between gNBs 130a, 130b (e.g., in dual connectivity embodiments in which a split bearer 340, 360 is being handled by the gNB-CU-UP 160 in a first gNB 130a for PDCP 260b layer processing, and by the gNB-DU 180 in a second gNB 130b for RLC 270f and MAC 280b layer processing).

To enable the address exchange, a mechanism is provided for a secured tunnel server to signal its inner and outer addresses, useful for direct IPsec tunneling, to a node that connects to the DUs. In this example, the secured tunnel server is a gNB-CU-UP 160 that will perform PDCP 260 layer processing for a bearer 330, 340, 350, 360 that will be established and signals its inner and outer addresses to the gNB-CU-CP 170, which connects to the gNB-DU 180 that performs RLC 270 and MAC 280 layer processing for that bearer 330, 340, 350, 360.

As shown in the example of FIG. 10, the gNB-CU-UP 160 signals User Plane inner and outer addresses to the gNB-CU-CP 170 during setup of the E1 interface. In particular, the gNB-CU-UP 160 may signal the User Plane inner and outer addresses to the gNB-CU-CP 170 via a GNB-CU-UP E1 SETUP REQUEST message (step 405), and the gNB-CU-CP 170 may respond with a GNB-CU-UP E1 SETUP RESPONSE message (step 410) indicating a successful outcome.

Although in FIG. 10, the gNB-CU-UP 160 is depicted as requesting E1 setup, in other embodiments, the gNB-CU-CP 170 may request E1 setup. In such embodiments, the inner and outer addresses may be signaled by the gNB-CU-UP 160 to the gNB-CU-CP 170 via a GNB-CU-CP E1 SETUP RESPONSE message. In yet other embodiments, the addresses may be signaled by the gNB-CU-UP 160 to the gNB-CU-CP 170 via a GNB-CU-UP MODIFICATION UPDATE message.

The gNB-CU-UP 160 User Plane addresses for direct IPsec tunneling received by the gNB-CU-CP 170 may then be provided to the gNB-DU 180 during setup of the F1 interface. In particular, the inner and outer addresses may be signaled by the gNB-CU-CP 170 to the gNB-DU 180 via an F1 SETUP REQUEST message (step 415), and the gNB-DU 180 may respond with an F1 SETUP RESPONSE message (step 420). Thus, a mechanism may be provided for the gNB-CU-CP 170 to signal the inner and outer addresses received from the node hosting PDCP 260 (e.g., the gNB-CU-UP 160) for a bearer 330, 340, 350, 360 to the node hosting the lower layers (e.g., the gNB-DU 180) for that bearer 330, 340, 350, 360.

Although in FIG. 10, the gNB-CU-CP 170 is depicted as requesting F1 setup, in other embodiments, the gNB-DU 180 may request F1 setup. In such embodiments, the inner and outer addresses may be signaled by the gNB-CU-CP 170 to the gNB-DU 180 via an F1 SETUP RESPONSE message. In yet other embodiments, the addresses may be signaled by the gNB-CU-CP 170 to the gNB-DU 180 via a GNB-CU CONFIGURATION UPDATE message.

The secured tunnel (e.g. IPSec tunnel) can be established soon after the E1 and F1 interfaces are established (step 425), or in general before any UE 30 is served with UP traffic. Once the secured tunnel is established, this tunnel may be used for establishment of any UP connection between the RAN and UE 30. In particular, the secured tunnel can be used to host UP connections transporting user plane traffic for a given UE 30. According to embodiments, this may enable security tunnels to become a common asset used for several UEs and can be established a priori of serving any UP user services.

For example, as shown in FIG. 10, once the IPsec tunnel has been established, the gNB-CU-CP 160 may signal, to the gNB-CU-CP 170, a request to setup a DRB (e.g., using a BEARER CONTEXT SETUP REQUEST message) (block 430), and the gNB-CU-CP 170 may respond with a message to indicate that the DRB has been successfully setup (e.g., in a BEARER CONTEXT SETUP RESPONSE) (block 435). The gNB-CU-CP 170 may then signal, to the gNB-DU 180, a request to setup a UE context (e.g., using a UE CONTEXT SETUP REQUEST message) (block 440), and the gNB-DU 180 may respond with a message to indicate that the UE context has been successfully setup (e.g., in a UE CONTEXT SETUP RESPONSE message) (block 445). As shown in FIG. 10, a General Packet Radio Service (GPRS) Tunneling Protocol User Plane (GTP-U) tunnel may be established over the previously established IPsec tunnel (block 450).

The embodiments above enable the secured tunnel server to signal the inner and outer addresses towards the node hosting the lower layers (e.g., the gNB-DU 180) that would have to send a request for secured tunnel setup, e.g., in an IPSec tunnel setup request. Without such embodiments, the node hosting lower layers may be unable to discover to which addresses such a request should be sent.

In addition to the embodiments discussed above, other embodiments herein allow the inner and outer addresses of the node(s) hosting the lower layers to be known to the node hosting upper layers (which will act as a security connection server, e.g. an IPSec server). Such embodiments may be advantageous when, e.g., the node hosting PDCP 260 needs to know whether a request to establish a secured tunnel comes from a legitimate source. Among other things, this may help the server to ensure that only pre-configured and authorized nodes are able to establish a secured tunnel connection with the server.

To know whether the source is legitimate, the inner and outer addresses of, e.g., the gNB-DU 180 may be made known at the node hosting PDCP, e.g., the gNB-CU-UP 160. This may be achieved by the gNB-DU 180 signaling the User Plane inner and outer addresses for direct IPsec tunneling to the gNB-CU-CP 170 during setup of the F1 interface. In particular, the gNB-DU 180 User Plane inner and outer addresses for direct IPsec tunneling may be signaled to the gNB-CU-CP 170 via an F1 SETUP REQUEST message, F1 SETUP RESPONSE message, and/ or an F1 GNB-DU CONFIGURATION UPDATE message. Further, the gNB-DU 180 User Plane inner and outer addresses for direct IPsec tunneling may then be provided to the gNB-CU-UP 160 during setup of the E1 interface. More particularly, the gNB-DU 180 User Plane inner and outer addresses for direct IPsec tunneling may be provided to the gNB-CU-UP 160 by the gNB-CU-CP 170 via a GNB-CU-CP E1 SETUP REQUEST message, GNB-CU-UP E1 SETUP RESPONSE message, and/or GNB-CU-CP MODIFICATION UPDATE message. As will be readily appreciated from the above, the particular messages used, and the ordering thereof, may depend on which nodes are making the request for setup of the E1 and F1 interfaces. Indeed, in some cases, the interfaces may be established concurrently, e.g., with E1 and F1 setup request messages (sending the server's inner and outer addresses in one direction) both occurring before the E1 and F1 setup response messages (sending the client's inner and outer addresses in the other direction).

Further, although in some embodiments the node hosting PDCP 260 is represented as also being the server side of the secured tunnel connection, other embodiments may include the server side of the secured tunnel connection not being located at the node hosting PDCP 260. Rather, other embodiments include the server being the node that provides the inner and outer addresses to the node hosting the lower layers (e.g., the server may be the gNB-CU-CP 170).

Although FIG. 10 illustrates an example in which an E1 interface is setup between a gNB-CU-UP 160 and a gNB-CU-CP 170, similar principles may be applied when these nodes are instead separated by an Xn interface. Accordingly, exchange of inner and outer addresses between an MN 510 and an SN 520 node hosting the lower layers of the split bearer may be performed for MR-DC configurations (i.e., DC configurations within an NG-RAN system) using a variety of messages, depending on which node is initiating certain requests (or performing certain configuration updates) and which interfaces are involved (e.g., Xn, F1). For example, exchanging IPSec addresses (i.e., the inner and outer addresses) between the MN 510 and SN 520 (e.g., by any CU-CPs 210 and/or DUs 230 therein), in either or both directions, may be performed using an Xn SETUP REQUEST, Xn SETUP RESPONSE, NG-RAN NODE CONFIGURATION UPDATE, F1 SETUP RESPONSE, F1 SETUP REQUEST, gNB-CU CONFIGURATION UPDATE, and/or gNB-DU CONFIGURATION UPDATE message, according to similar principles as described above with respect to FIG. 10.

Figure 11:
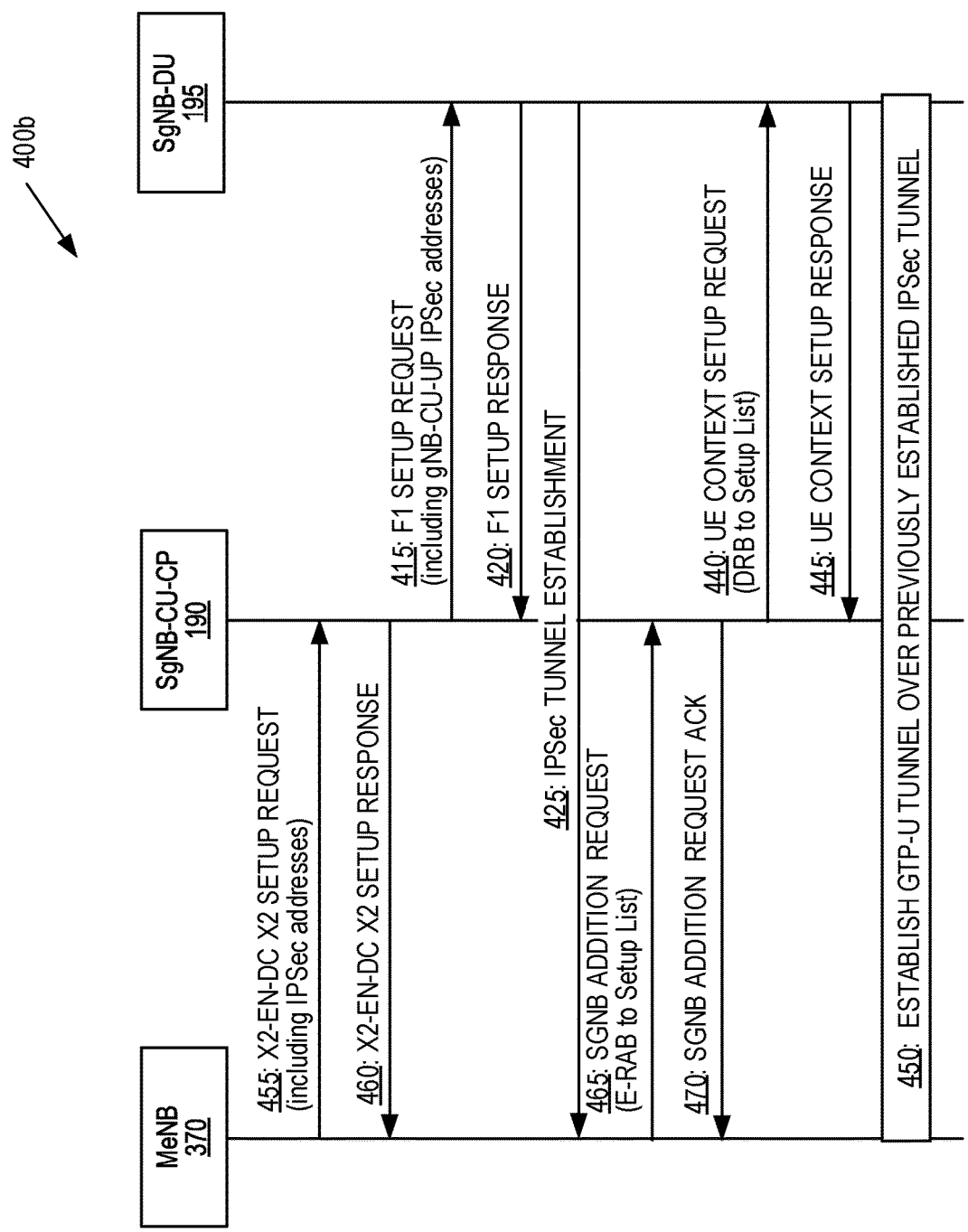

FIG. 11 illustrates another example tunnel establishment procedure 400b. In the example tunnel establishment procedure 400b, the node hosting the server of the secured tunnel connection (e.g., an IPSec server) is an MN 510 that will enter into a DC configuration with an SN 520, and the secured tunnel is established between the MN 510 (e.g., an MgNB 300, an MeNB 370) and the SN 520 (e.g., an SgNB 310). More particularly, in this example, the secured tunnel is between the an MeNB 370 and the node within the SN 520 hosting the lower layers (i.e., an SgNB-DU 195 in this example) for an MCG split bearer 340 that will be established.

As shown in the example of FIG. 11, the MeNB 370 signals User Plane inner and outer addresses to the SgNB-CU-CP 190 during setup of the X2 interface. In particular, the MeNB 370 may signal the User Plane inner and outer addresses to the SgNB-CU-CP 190 via an X2-EN-DC X2 SETUP REQUEST message (step 455), and the SgNB-CU-CP 190 may respond with an X2-EN-DC X2 SETUP RESPONSE message (step 460) indicating a successful outcome.

The MeNB 370 User Plane addresses for direct IPsec tunneling received by the SgNB-CU-CP 190 may then be provided to the SgNB-DU 195 during setup of the F1 interface. In particular, the inner and outer addresses may be signaled by the SgNB-CU-CP 190 to the SgNB-DU 195 via an F1 SETUP REQUEST message (step 415), and the SgNB-DU 195 may respond with an F1 SETUP RESPONSE message (step 420). Thus, a mechanism may be provided for the SgNB-CU-CP 190 to signal the inner and outer addresses received from the node hosting MN PDCP 530b (e.g., the MeNB 370) for an MCG split bearer 340 to the node hosting the lower layers (e.g., the SgNB-DU 195) for the MCG split bearer 340.

The secured tunnel (e.g. IPSec tunnel) can be established soon after the X2 and F1 interfaces are established (step 425), or in general before any UE 30 is served with UP traffic. Once the secured tunnel is established, this tunnel may be used for establishment of any UP connection between the RAN and UE 30. In particular, the secured tunnel can be used to host UP connections transporting user plane traffic for a given UE 30. According to embodiments, this may enable security tunnels to become a common asset used for several UEs and can be established a priori of serving any UP user services.

Once the IPsec tunnel has been established, the MeNB 370 may signal, to the SgNB-CU-CP 190, a request to add the SgNB 310 as an SN 520 of a dual configuration (e.g., using an SGNB ADDITION REQUEST message) (block 465), and the SgNB-CU-CP 190 may respond with a message acknowledging the request (e.g., in an SGNB ADDITION REQUEST ACK message) (block 470). The SgNB-CU-CP 190 may then signal, to the SgNB-DU 195, a request to setup a UE context (e.g., using a UE CONTEXT SETUP REQUEST message) (block 440), and the SgNB-DU 195 may respond with a message to indicate that the UE context has been successfully setup (e.g., in a UE CONTEXT SETUP RESPONSE message) (block 445). As shown in FIG. 11, a GTP-U tunnel may then be established over the previously established IPsec tunnel (block 450).

Accordingly, exchange of inner and outer addresses between an MN 510 and an SN 520 node hosting the lower layers of the split bearer may be performed for EN-DC configurations (i.e., in DC configurations in which the MN 510 is an eNB and the SN 520 is a gNB 130) using a variety of messages, depending on which node is initiating certain requests (or performing certain configuration updates) and which interfaces are involved (e.g., X2, F1). For example, exchanging IPSec addresses (i.e., the inner and outer addresses) between the MN 510 and SN 520 (e.g., by any CU-CP 210 and/or DU 230 therein), in either or both directions, may be performed using an X2: EN-DC X2 SETUP REQUEST, X2: EN-DC X2 SETUP RESPONSE, X2: EN-DC CONFIGURATION UPDATE, X2: EN-DC CONFIGURATION UPDATE ACKNOWLEDGE, F1 SETUP REQUEST, F1 SETUP RESPONSE, gNB-CU CONFIGURATION UPDATE, and/or gNB-DU CONFIGURATION UPDATE messages, according to similar principles as described above with respect to FIG. 10 and/or FIG. 11.

The embodiments above enable the secured tunnel server to signal the inner and outer addresses between different nodes that host different layers of a bearer to be established in a variety of circumstances, including embodiments in which the endpoints of the tunnel are not collocated. These addresses are used by nodes terminating User Plane interfaces (e.g., F1-U, X2-U, Xn-U) to setup a direct IPsec tunnel for User Plane interfaces, which may enable the transport of traffic at lower latency and/or backhaul traffic offloading. The IPsec tunnels of various embodiments may be used for Dual Connectivity, Data Forwarding, and/or Higher-Layer split traffic.

Particular embodiments enable the setup of a secure tunnel between a server and a client of the secure tunnel protocol before any UP connection for a specific UE is established. This may greatly improve the performance of UP connection establishment because a UP connection may avoid establishment delays for secure tunnel connections setups.

Notwithstanding, according to other embodiments, secure tunnels can be setup when a UP connection is established. Although such embodiments are generally less optimized and subject to longer establishment delays, they may result in higher simplicity. In at least some such embodiments, gNB-CU-UP 160 and gNB-DU 180 User Plane inner and outer addresses for direct IPsec tunneling are signaled over the E1: BEARER SETUP and/or E1: BEARER MODIFICATION procedures for each bearer established, with the gNB-CU-CP 170 acquiring the gNB-DU 180 addresses via procedures over the F1 interfaces. Further, the gNB-CU-UP 160 inner and outer User Plane addresses for direct IPsec tunneling are provided to the gNB-DU 180 and SgNB-DU 195 inner and outer User Plane addresses are provided to the gNB-CU-CP 170 over the F1: UE CONTEXT SETUP procedures and F1:UE CONTEXT MODIFICATION REQUEST procedures for each bearer to be setup.

To also address cases of DC and establishment of secured tunnels at the time of bearer establishment, the MeNB 370 and SgNB 310 may exchange User Plane inner and outer addresses for direct IPsec tunneling at X2: SGNB ADDITION and X2: SGNB MODIFICATION procedures for each bearer to be established. The SgNB 310 addresses are those of the SgNB-DU 195 obtained by the gNB-CU-CP 170 over the F1 interface. Further, the MN 510 and SN 520 in an NG-RAN 120 may exchange User Plane inner and outer addresses for direct IPsec tunneling at Xn: S-NODE ADDITION and S-NODE MODIFICATION procedures for each bearer to be established. The SN 520 addresses are those of the SN 520 DU 230 obtained by the SN 520 CU-CP 210 (e.g., the SgNB-CU-CP 190) over the F1 interface. In addition, the SN 520 CU-CP 210 and SN 520 DU 230 exchange User Plane inner and outer addresses for direct IPsec tunneling over the F1: UE CONTEXT SETUP and F1: UE CONTEXT MODIFICATION procedures.

For the remainder of this disclosure, the term UP UL UP TNL Information IE is used to describe the inner address of the server (e.g. CU-UP 210, MeNB 370, MN 510), the term UP DL UP TNL Information IE will be used to describe the inner address of the client (e.g. DU 230), and the term IP-Sec Transport Layer Address IE will be used to describe the outer address of the server or the client side.

According to embodiments of the present disclosure, the IPSec setup occurs in NR. To that end, the exchange of inner and outer IPSec addresses between gNB-DU 180 and gNB-CU 140 is performed, and the setup of IPSec connections may take place at DRB establishment. Thus, IPSec connections between gNB-DUs 180 and gNB-CU-UPs 160 are setup at the time of DRB establishment.

In order to achieve this, the gNB-CU-UP 160 provides, to the gNB-CU-CP 170, its inner and outer addresses (i.e., the target addresses to be used by the gNB-DU for establishment of IP Sec) at DRB establishment. The latter can be achieved via signaling of the gNB-CU-UP UL UP TNL Information IE and IP-Sec Transport Layer Address IE over a E1: BEARER SETUP REQUEST message or a E1: BEARER MODIFICATION REQUEST message. As explained above, the gNB-DU 180 is able to signal its inner and outer addresses to the gNB-CU-CP 170 via the F1 interface. Once this is in place, the gNB-DU 180 addresses can be signaled to the gNB-CU-UP 160 via the E1: BEARER SETUP REQUEST, E1: BEARER SETUP RESPONSE, E1: BEARER MODIFICATION REQUEST and/or E1: BEARER SETUP RESPONSE messages.

To enable the gNB-DU 180 to receive the IPSec addresses in use by the gNB-CU-UP(s) 160, the gNB-CU-CP 170 may signal them at DRB setup. The latter can take place by adding the IPSec addresses of CU-UPs 220 over the F1:UE CONTEXT SETUP REQUEST or F1:UE CONTEXT MODIFICATION REQUEST. As explained above, the gNB-DU 180 is able to signal its inner and outer addresses to the gNB-CU-CP 170 via F1. This can occur via the F1: UE CONTEXT SETUP REQUEST, F1: UE CONTEXT SETUP RESPONSE, F1:UE CONTEXT MODIFICATION REQUEST, and/or F1:UE CONTEXT MODIFICATION RESPONSE.

However, as previously noted, setting up IPSec at DRB establishment is often inefficient and increases the delay needed to establish an IPSec tunnel, which can be a significant drawback. This delay can potentially pose a considerable performance penalty on the end to end establishment of a UP connection for a UE.

Accordingly, given a gNB-DU 180 and a gNB-CU-UP 160 between which DRBs could be setup for one or more UEs, other embodiments of the present disclosure set up secure tunnel(s) (e.g., IPSec tunnels) before the setup of any DRB (i.e., before DRB establishment). That is, IPSec connections between gNB-DUs 180 and gNB-CU-UPs 160 that can handle DRBs for a given UE can be established in advance of any DRB setup.

In order to achieve secure tunnel setup in advance of DRB setup, the gNB-CU-UP 160 can provide to the gNB-CU-CP 170 its inner and outer addresses (i.e., the target addresses to be used by the gNB-DU 180 for establishment of secured tunnels, e.g. IP Sec) before the establishment of any bearers occurs. The latter can be achieved via signaling of the gNB-CU-UP UL UP TNL Information IE and IP-Sec Transport Layer Address IE over the GNB-CU-UP E1 SETUP REQUEST, GNB-CU-CP E1 SETUP RESPONSE and GNB-CU-UP CONFIGURATION UPDATE.

In order to allow the gNB-DU 180 to receive the inner and outer addresses in use by the gNB-CU-UP(s) 160, the gNB-CU-CP 170 can signal them before any DRB setup takes place. The latter can take place by adding the addresses of CU-UPs over the F1 SETUP RESPONSE and gNB-CU CONFIGURATION UPDATE.

In another embodiment, in EN-DC, a direct UP interface can be established between MeNB 370 and SgNB-DU 195. This interface may also be secured via IPSec. Traditionally, the X2 interface does not provide the ability to signal IPSec addresses at E-UTRAN Radio Access Bearer (E-RAB) setup between an MeNB 370 and an SgNB 310. However, embodiments of the present disclosure include the ability to signal an IP-Sec Transport Layer Address IE for each E-RAB setup at SgNB Addition/Modification. This may be accomplished by passing the IPSec addresses (inner and outer addresses equivalent to the UL UP TNL Information IE and IP-Sec Transport Layer Address IE) of the MeNB 370 to the SgNB-CU-CP 190 over X2. Further, the gNB-CU-CP 190 should pass such addresses to the SgNB-DU 195 over the F1 interface.

In order to achieve such configuration at UP connection setup, embodiments signal the UL UP TNL Information IE and IP-Sec Transport Layer Addresses from MeNB to the SgNB-CU-CP 190 at X2: SGNB ADDITION REQUEST and X2: SGNB MODIFICATION REQUEST. Further, the UL UP TNL Information IE and IP-Sec Transport Layer Address IE is signaled from the SgNB-CU-CP 190 to the SgNB-DU at F1: UE CONTEXT SETUP REQUEST and F1: UE CONTEXT MODIFICATION REQUEST.

As stated above, embodiments of the present disclosure include mechanisms to send inner and outer addresses of a SgNB-DU 195 to the MeNB 370. This may be achieved by sending, from the SgNB 310 to the MeNB 370, User Plane inner and outer addresses for direct IPsec tunneling at X2: SGNB ADDITION and X2: SGNB MODIFICATION procedures for each bearer to be established. The SgNB 310 addresses are those of the SgNB-DU 195 obtained by the gNB-CU-CP 170 over the F1 interface.

As noted above, setting up an IPSec tunnel at the time of establishing the UP interface may result in long setup delays. To avoid this delay, IPSec tunnels may be set up "a priori" between an MeNB 370 and an SgNB-DU 195 to serve UEs 30 in future EN-DC configurations.

Accordingly, in another embodiment, IPSec establishment at EN-DC occurs before UP connection setup. In order to achieve this before UP connection setup, embodiments signal the MeNB IPSec addresses (inner and outer addresses equivalent to the UL UP TNL Information IE and IP-Sec Transport Layer Address IE) to the SgNB 310 at X2: EN-DC X2 SETUP REQUEST or X2: EN-DC X2 SETUP RESPONSE (depending on the node initiating the EN-DC X2 connection). Further, the MeNB IPSec addresses (inner and outer addresses equivalent to the UL UP TNL Information IE and IP-Sec Transport Layer Address IE) may be signaled to the SgNB at X2: EN-DC CONFIGURATION UPDATE, and the MeNB IPSec addresses (inner and outer addresses equivalent to the UL UP TNL Information IE and IP-Sec Transport Layer Address IE) received at SgNB-CU may be signaled to the SgNB-DU at F1 SETUP RESPONSE and gNB-CU CONFIGURATION UPDATE.

As mentioned above, the SgNB-DU 195 may signal its inner and outer addresses to the MeNB 370 by means of adding inner and outer addresses to the F1 SETUP procedure messages, and F1 DU Configuration Update procedure messages. The SgNB-CU receiving the SgNB-DU 195 inner and outer addresses can signal them to the MeNB 370 via SGNB ADDITION and X2: SGNB MODIFICATION procedure messages.

In another embodiment, in MR-DC a direct UP interface can be established between MN 510 and SN 520 at bearer establishment. Likewise, similar procedures would be needed. One notable difference however is that the IPSec addresses (inner and outer addresses equivalent to the UL UP TNL Information IE and IP-Sec Transport Layer Address IE) of the MN 510 and the SN 520 are exchanged via the Xn: S-NODE ADDITION procedure, S-NODE MODIFICA-TION procedure, F1: UE CONTEXT SETUP procedure and F1: UE CONTEXT MODIFICATION procedure.

In another embodiment, in MR-DC, a direct UP interface can be established between MN and SN before bearer establishment. Likewise, similar procedures would be needed. One notable difference however is that the IPSec addresses (inner and outer addresses equivalent to the UL UP TNL Information IE and IP-Sec Transport Layer Address IE) of the MN 510 and the SN 520 are exchanged via the Xn SETUP REQUEST procedure, NG-RAN NODE CONFIGURATION UPDATE procedure, F1 SETUP procedure and F1: GNB-CU CONFIGURATION UPDATE procedure messages.

Figure 12:
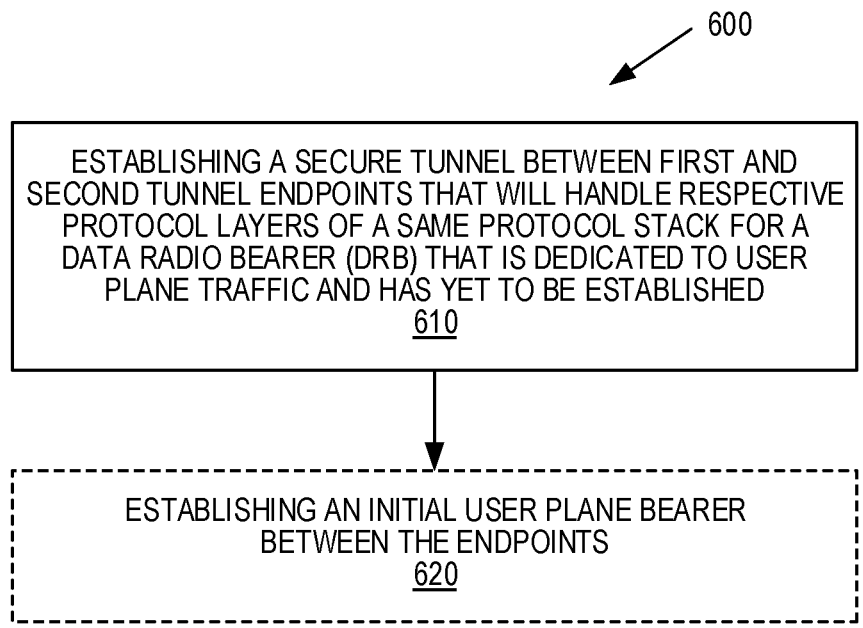
FIG. 12 is a flow diagram illustrating an example method implemented by a network node, according to one or more embodiments of the present disclosure.

In view of all of the above, FIG. 12 illustrates an example method 600 of providing user plane security performed by a network node of a wireless communication network. The method 600 comprises establishing a secure tunnel between first and second tunnel endpoints that will handle respective protocol layers of a same protocol stack for a Data Radio Bearer (DRB) that is dedicated to user plane traffic and has yet to be established (block 610). Establishing the secure tunnel may comprise exchanging an inner Internet Protocol (IP) address and an outer IP address of each of the endpoints between the endpoints, as discussed above.

In some embodiments, the method 600 further comprises establishing an initial user plane bearer between the endpoints (block 620). In some embodiments, the establishing of the secure tunnel is performed before the establishing of the initial user plane bearer. In other embodiments, the establishing of the secure tunnel is performed during the establishing of the initial user plane bearer.

Figure 13:
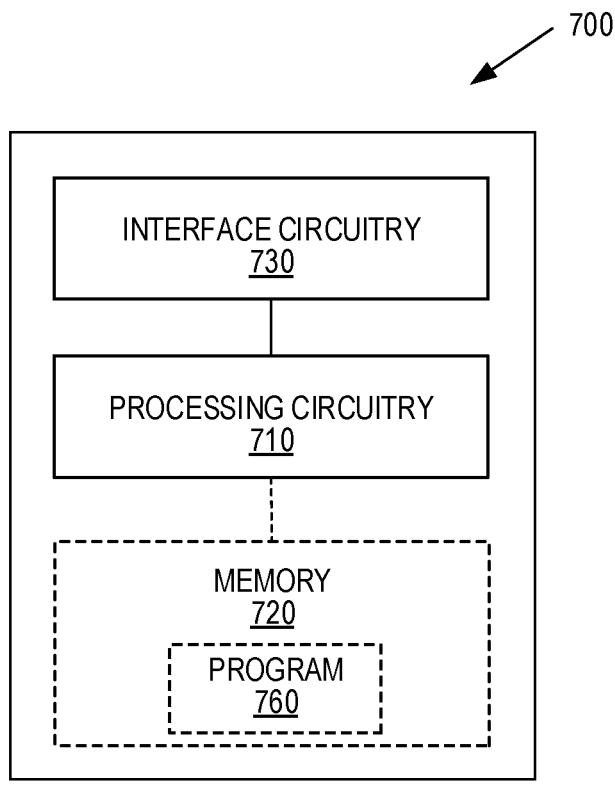
FIG. 13 is a schematic block diagram illustrating an example network node, according to one or more embodiments of the present disclosure.

FIG. 13 illustrates an example network node 700 according to particular embodiments of the present disclosure. The network node 700 may be, for example, a gNB 130 or an eNB. The network node may also be an MN (510) (e.g., an MeNB 370, an MgNB 300) or an SN (520) (e.g., an SeNB, an SgNB 310). The network node 700 of FIG. 13 comprises processing circuitry 710 and interface circuitry 730. The processing circuitry 710 is communicatively coupled to the interface circuitry 730, e.g., via one or more buses. In some embodiments, the network node 700 further comprises memory circuitry 720 that is communicatively coupled to the processing circuitry 710, e.g., via one or more buses. According to particular embodiments, the processing circuitry 710 is configured to perform one or more of the methods described herein (e.g., the method 200 of FIG. 12).

The processing circuitry 710 may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry 710 may be programmable hardware capable of executing software instructions of a computer program 760 stored in the memory circuitry 720 whereby the processing circuitry 710 is configured. The memory circuitry 720 of the various embodiments may comprise any non-transitory machine-readable media known in the art or that may be developed, whether volatile or non-volatile, including but not limited to solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, wholly or in any combination.

The interface circuitry 730 may be a controller hub configured to control the input and output (I/O) data paths of the network node 700. Such I/O data paths may include data paths for exchanging signals over a communications network and/or data paths for exchanging data internally among components of the network node 700. For example, the interface circuitry 730 may comprise a transceiver configured to send and receive communication signals over one or more of a cellular network, Ethernet network, or optical network. The interface circuitry 730 may be implemented as a unitary physical component, or as a plurality of physical components that are contiguously or separately arranged, any of which may be communicatively coupled to any other, or may communicate with any other via the processing circuitry 710. For example, the interface circuitry 730 may comprise transmitter circuitry configured to send communication signals over a communications network and receiver circuitry configured to receive communication signals over the communications network. Other embodiments may include other permutations and/or arrangements of the above and/or their equivalents.

According to a particular embodiment, the network node 700 is configured to establish a secure tunnel between first and second tunnel endpoints that will handle respective protocol layers of a same protocol stack for a Data Radio Bearer (DRB) that is dedicated to user plane traffic and has yet to be established. To establish the secure tunnel, the network node may exchange an inner Internet Protocol (IP) address and an outer IP address of each of the endpoints between the endpoints.

Figure 14:
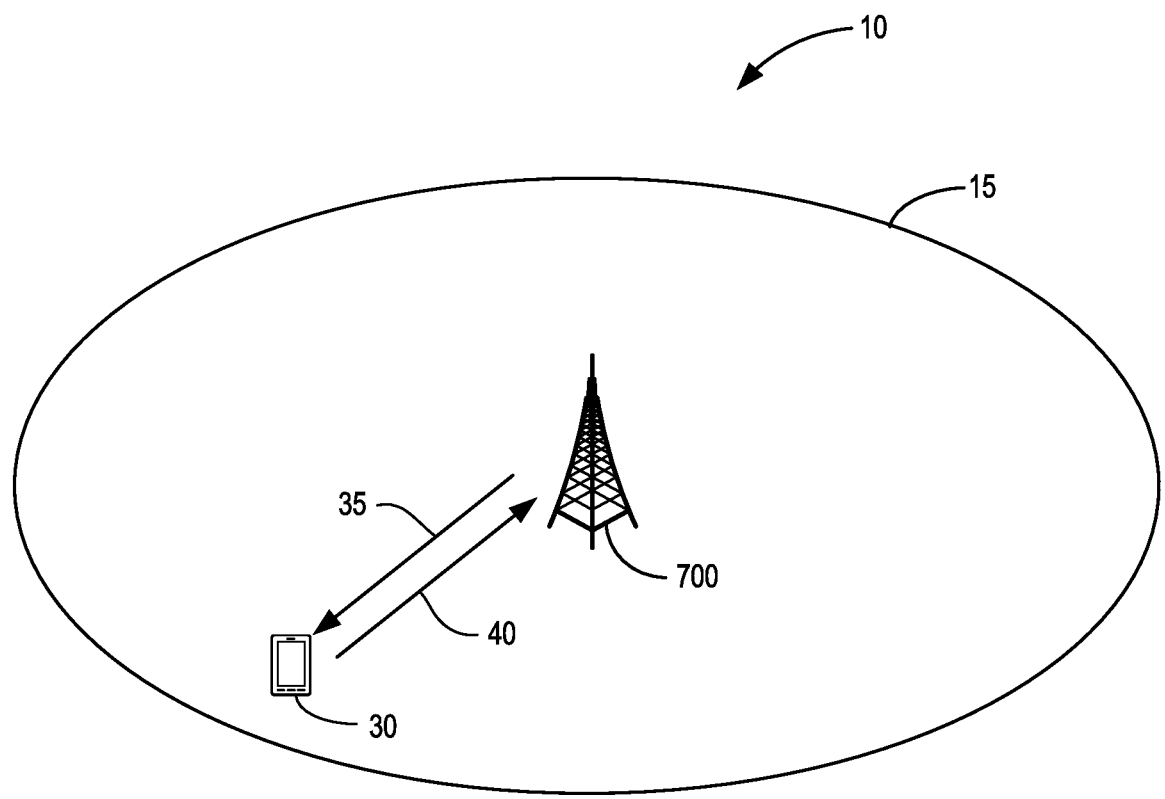
FIG. 14 is a schematic diagram illustrating an example network.

Another example of the network node 700 is illustrated in FIG. 14, which illustrates communications between the network node 700 and a user equipment (UE) 30 in a wireless communication network 10. The network node 700 provides radio coverage to the UE 30 in a cell 15 of the wireless communication network 10. The UE 30 may comprise, for example, a cellular telephone, smart phone, laptop computer, notebook computer, tablet, machine-to-machine (M2M) communication device (also referred to as machine-type communication (MTC) device), or other device with wireless communication capabilities. The network node 700 transmits data to the UE 30 on the downlink (DL) 35, which comprises multiple channels. These DL channels include the Physical Downlink Shared Channel (PDSCH), the Physical Downlink Control Channel (PDCCH), and the Physical Broadcast Channel (PBCH). The UE 30 transmits data to the network node 700 in the Uplink (UL) 40 on the Physical Uplink Shared Channel (PUSCH).

NR is developed for flexibility in supporting multiple and substantially different use cases. Besides the typical mobile broadband use case, NR will also support machine type communication (MTC), ultra-low latency critical communications (URLCC), side-link device-to-device (D2D) and several other use cases too. As discussed above, the network node 700 may be a node that supports a dual or multi connectivity configuration of the UE 30. In such embodiments, one or more other network nodes (not shown) may also provide radio coverage to the UE 30 (e.g., concurrently with the network node 700).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Although some of the embodiments contemplated herein are described more fully with reference to the figures, other embodiments are contained within the scope of the subject matter disclosed herein. The disclosed subject matter should not be construed as limited to only the embodiments set forth herein; rather, these embodiments are provided by way of example to convey the scope of the subject matter to those skilled in the art.

Embodiments of the present disclosure may, of course, be carried out in other ways than those specifically set forth herein without departing from essential characteristics of the invention. The present embodiments are to be considered in all respects as illustrative and not restrictive, and all changes coming within the meaning and equivalency range of the appended enumerated embodiments and the attached Appendix are intended to be embraced therein.

What is claimed is:

1. A method of providing user plane security, performed by a network node of a radio access network (RAN) of a wireless communication network, the method comprising:
  establishing a secure tunnel between first and second tunnel endpoints that will handle respective protocol layers of a same protocol stack for a Data Radio Bearer (DRB) that is dedicated to user plane traffic and has yet to be established;
  wherein establishing the secure tunnel comprises exchanging an inner Internet Protocol (IP) address and an outer IP address of each of the endpoints between the endpoints.

2. The method of claim 1, further comprising:
  hosting the first tunnel endpoint, wherein the second tunnel endpoint is hosted by a further network node; and
  supporting, along with the further network node, a dual connectivity configuration of a User Equipment (UE) in which one of the network nodes is a master node and the other of the network nodes is a secondary node.

3. The method of claim 1, further comprising hosting the first tunnel endpoint and the second tunnel endpoint.

4. The method of claim 1, wherein exchanging the inner IP address and the outer IP address of each of the endpoints between the endpoints comprises exchanging the inner and outer IP addresses via a Central Unit Control Plane (CU-CP).

5. The method of claim 1, wherein one of the endpoints is a Central Unit User Plane (CU-UP).

6. The method of claim 1, wherein one of the endpoints is a Distributed Unit (DU).

7. The method of claim 1, further comprising using the secure tunnel to establish the DRB for the user plane traffic.

8. The method of claim 1, further comprising establishing, over the secure tunnel, a further tunnel from the network node to a core network supporting the RAN.

9. The method of claim 1, wherein one of the endpoints will handle a Packet Data Convergence Protocol (PDCP) layer for the DRB and the other of the endpoints will handle a Radio Link Control (RLC) layer for the DRB.

10. The method of claim 1, wherein exchanging the inner IP address and the outer IP address of each of the endpoints between the endpoints comprises exchanging the inner and outer IP address of at least one of the endpoints during setup of an E1 interface.

11. The method of claim 1, wherein exchanging the inner IP address and the outer IP address of each of the endpoints between the endpoints comprises exchanging the inner and outer IP address of at least one of the endpoints during setup of an X2 interface or during setup of an Xn interface.

12. The method of claim 1, wherein exchanging the inner IP address and the outer IP address of each of the endpoints between the endpoints comprises exchanging the inner and outer IP address of one of the endpoints during setup of an F1 interface.

13. A network node of a radio access network (RAN) of a wireless communication network, the network node comprising:
processing circuitry and a memory, the memory containing instructions executable by the processing circuitry, whereby the network node is configured to establish a secure tunnel between first and second tunnel endpoints that will handle respective protocol layers of a same protocol stack for a Data Radio Bearer (DRB) that is dedicated to user plane traffic and has yet to be established;
wherein to establish the secure tunnel, the network node is configured to exchange an inner Internet Protocol (IP) address and an outer IP address of each of the endpoints between the endpoints.

14. The network node of claim 13, wherein the network node is further configured to:
host the first tunnel endpoint, wherein the second tunnel endpoint is hosted by a further network node; and
support, along with the further network node, a dual connectivity configuration of a User Equipment (UE) in which one of the network nodes is a master node and the other of the network nodes is a secondary node.

15. The network node of claim 13, wherein the network node is further configured to host the first tunnel endpoint and the second tunnel endpoint.

16. The network node of claim 13, wherein to exchange the inner IP address and the outer IP address of each of the endpoints between the endpoints, the network node is configured to exchange the inner and outer IP addresses via a Central Unit Control Plane (CU-CP).

17. The network node of claim 13, wherein one of the endpoints is a Central Unit User Plane (CU-UP).

18. The network node of claim 13, wherein one of the endpoints is a Distributed Unit (DU).

19. The network node of claim 13, wherein the network node is further configured to use the secure tunnel to establish the DRB for the user plane traffic.

20. The network node of claim 13, wherein the network node is further configured to establish, over the secure tunnel, a further tunnel from the network node to a core network supporting the RAN.

21. The network node of claim 13, wherein one of the endpoints will handle a Packet Data Convergence Protocol (PDCP) layer for the DRB and the other of the endpoints will handle a Radio Link Control (RLC) layer for the DRB.

22. The network node of claim 13, wherein to exchange the inner IP address and the outer IP address of each of the endpoints between the endpoints the network node is configured to exchange the inner and outer IP address of at least one of the endpoints during setup of an E1 interface.

23. The network node of claim 13, wherein to exchange the inner IP address and the outer IP address of each of the endpoints between the endpoints the network node is configured to exchange the inner and outer IP address of at least one of the endpoints during setup of an X2 interface or during setup of an Xn interface.

24. The network node of claim 13, wherein to exchange the inner IP address and the outer IP address of each of the endpoints between the endpoints the network node is configured to exchange the inner and outer IP address of one of the endpoints during setup of an F1 interface.

25. A non-transitory computer readable medium storing a computer program product for controlling a programmable network node, the computer program product comprising software instructions that, when run on the programmable network node, cause the programmable network node to:
establish a secure tunnel between first and second tunnel endpoints that will handle respective protocol layers of a same protocol stack for a Data Radio Bearer (DRB) that is dedicated to user plane traffic and has yet to be established;
wherein to establish the secure tunnel, the network node is configured to exchange an inner Internet Protocol (IP) address and an outer IP address of each of the endpoints between the endpoints.

* * * * *